(12) United States Patent
Rossi et al.

(10) Patent No.: US 11,170,048 B2
(45) Date of Patent: Nov. 9, 2021

(54) SYSTEM FOR IDENTIFYING TYPED GRAPHLETS

(71) Applicant: Adobe Inc., San Jose, CA (US)

(72) Inventors: Ryan Rossi, Mountain View, CA (US);
Aldo Gael Carranza, Stanford, CA (US); David Arbour, San Jose, CA (US); Anup Rao, San Jose, CA (US); Sungchul Kim, San Jose, CA (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 318 days.

(21) Appl. No.: 16/451,956

(22) Filed: Jun. 25, 2019

(65) Prior Publication Data

US 2020/0410002 A1     Dec. 31, 2020

(51) Int. Cl.
*G06F 16/00* (2019.01)
*G06F 16/901* (2019.01)
*G06F 17/18* (2006.01)

(52) U.S. Cl.
CPC .......... *G06F 16/9024* (2019.01); *G06F 17/18* (2013.01)

(58) Field of Classification Search
CPC ...... G06F 16/9024; G06F 17/18; G06F 17/10; G06F 16/21; G06F 16/211
See application file for complete search history.

(56) References Cited

U.S. PATENT DOCUMENTS

| | | | |
|---|---|---|---|
| 7,620,678 B1 * | 11/2009 | Master | G06F 15/161 709/200 |
| 10,728,105 B2 * | 7/2020 | Rossi | H04L 41/22 |
| 10,936,658 B2 * | 3/2021 | Wu | G06F 17/16 |
| 2014/0279838 A1 * | 9/2014 | Tsirogiannis | G06F 16/22 707/603 |
| 2015/0117327 A1 * | 4/2015 | Nordstrom | H04W 72/082 370/329 |
| 2016/0154895 A1 * | 6/2016 | Koutra | G06N 5/048 706/46 |

(Continued)

OTHER PUBLICATIONS

Ahmed et al., "Efficient Graphlet Counting for Large Networks", 2015, In ICDM, 10 pages.

(Continued)

*Primary Examiner* — Noosha Arjomandi
(74) *Attorney, Agent, or Firm* — Finch & Maloney PLLC

(57) ABSTRACT

A system is disclosed for identifying and counting typed graphlets in a heterogeneous network. A methodology implementing techniques for the disclosed system according to an embodiment includes identifying typed k-node graphlets occurring between any two selected nodes of a heterogeneous network, wherein the nodes are connected by one or more edges. The identification is based on combinatorial relationships between (k–1)-node typed graphlets occurring between the two selected nodes of the heterogeneous network. Identification of 3-node typed graphlets is based on computation of typed triangles, typed 3-node stars, and typed 3-paths associated with each edge connecting the selected nodes. The method further includes maintaining a count of the identified k-node typed graphlets and storing those graphlets with non-zero counts. The identified graphlets are employed for applications including visitor stitching, user profiling, outlier detection, and link prediction.

20 Claims, 12 Drawing Sheets

Identification of Typed Graphlets
100

(56) References Cited

U.S. PATENT DOCUMENTS

| | | | | |
|---|---|---|---|---|
| 2017/0357905 | A1* | 12/2017 | Rossi | G06N 7/005 |
| 2018/0365019 | A1* | 12/2018 | Rossi | G06F 16/2471 |
| 2019/0130264 | A1* | 5/2019 | Rossi | G06N 5/022 |
| 2019/0222567 | A1* | 7/2019 | Caldera | H04L 63/0823 |
| 2019/0258963 | A1* | 8/2019 | Guo | G06N 20/00 |
| 2019/0325343 | A1* | 10/2019 | Feng | G06F 16/9024 |
| 2020/0142957 | A1* | 5/2020 | Patra | G06N 3/04 |
| 2020/0162340 | A1* | 5/2020 | Rossi | H04L 41/12 |
| 2020/0193323 | A1* | 6/2020 | Alesiani | G06N 3/08 |
| 2020/0285944 | A1* | 9/2020 | Lee | G06N 3/08 |
| 2020/0342006 | A1* | 10/2020 | Rossi | G06F 16/28 |

OTHER PUBLICATIONS

Ahmed et al., "Graphlet Decomposition: Framework, Algorithms, and Applications", arXiv:1506.04322, Feb. 15, 2016, 32 pages.

Ahmed et al., "Estimation of Local Subgraph Counts", In Proceedings of the IEEE International Conference on BigData, 2016, pp. 586-595.

Hayes et al., "Graphlet-based measures are suitable for biological network comparison", Bioinformatics, 2013, vol. 29, pp. 483-491.

Hocevar T and J Demsar, "A combinatorial approach to graphlet counting", Bioinformatics, 2014, vol. 30, pp. 559-565.

Marcus D and Y Shaviit, "RAGE—a rapid graphlet enumerator for large networks", Computer Networks, 2012, vol. 56, pp. 810-819.

Milo et al., "Network motifs: simple building blocks of complex networks", Science 298, 2002, pp. 824-827.

Rossi et al., "Estimation of Graphlet Counts in Massive Networks", In IEEE Transactions on Neural Networks and Learning Systems (TNNLS), 2018, 14 pages.

Shervashidze et al., "Efficient graphlet kernels for large graph comparison", Proceedings of the 12th International Conference on Articial Intelligence and Statistics (AISTATS), 2009, vol. 5, pp. 488-495.

Zhang et al., "Discovering Discriminative Graphlets for Aerial Image Categories Recognition", IEEE Transactions on Image Processing, Dec. 2013, vol. 22, pp. 5071-5084.

Gu et al., "From homogeneous to heterogeneous network alignment via colored graphlets", arXiv:1704.01221, Mar. 28, 2018, 32 pages.

Ribeiro P and F Silva, "Discovering colored network motifs", 2014, In Complex Networks V. Springer, 12 pages.

Wernicke S and F Rasche, "FANMOD: a tool for fast network motif detection", Bioinformatics, 2006, vol. 22, pp. 1152-1153.

Carranza et al., "Higher-order Spectral Clustering for Heterogeneous Graphs", arXiv: 1810.02959, Oct. 6, 2018, 15 pages.

Rossi et al., "Heterogeneous Network Motifs", retrieved from the Internet: https://www.groundai.com/project/heterogeneous-network-motifs1809 [copy retrieved May 26, 2019], 36 pages.

\* cited by examiner

Heterogeneous Network
200

Examples of 3-Node Graphlets
250

251   252

Examples of 4-Node Graphlets
260

261   262   263

264   265   266

Heterogeneous Network
400

IPs
410

Sessions
(cookie IDs)
420

Pages
430

Identified Graphlets
600

610

620

630

640

Typed 3-node Sets
900 typed $T_{ij}$ sets
910 typed $S_j$ sets
920 typed $S_i$ sets
930

SYSTEM FOR IDENTIFYING TYPED GRAPHLETS

FIELD OF THE DISCLOSURE

This disclosure relates to analysis of heterogeneous networks (or typed graphs). Particularly, this disclosure relates to techniques for identifying and counting typed graphlets in a heterogeneous network.

BACKGROUND

Heterogeneous networks (also referred to as attributed networks or heterogeneous graphs) comprise nodes connected by edges, wherein some or all of the nodes and/or edges can be labeled with a specified "type" such as, for example, an attribute/feature, a class label, etc. The type is indicative of a characteristic, a class, or an information item of any sort that is meant to be associated with that node or edge. Heterogeneous networks arise ubiquitously in the natural world where nodes and edges of multiple types are observed. This is true, for example, in networks between: humans, neurons, routers and autonomous systems, web pages, devices and sensors, infrastructure (roads, airports, power stations), vehicles (cars, satellites, drones), and information in general. Identifying and counting subgraphs of these heterogeneous networks is of fundamental and practical importance in many applications. Despite this fact, however, identifying and counting subgraphs in large heterogeneous networks remains a challenging problem. Existing approaches generally require enormous computing resources which make them impractical for most purposes.

DETAILED DESCRIPTION

As noted previously, heterogeneous networks, which include "typed" nodes and edges, frequently arise in the natural world where nodes and edges of multiple types are observed. Examples of such networks include networks between: humans, neurons, routers and autonomous systems, web pages, devices and sensors, infrastructure (roads, airports, power stations), vehicles (cars, satellites, drones), and information in general. The nodes represent each item of the network (e.g., human, neuron, router, etc.). The edges represent the connections between the nodes. The types indicate a characteristic, a class, an attribute, a feature, a label, or an information element of any sort that is meant to be associated with a given node or edge. Heterogeneous networks, for the purposes of this disclosure, may also be referred to, for example, as attributed networks, labeled networks, or heterogeneous graphs.

Figure 2:
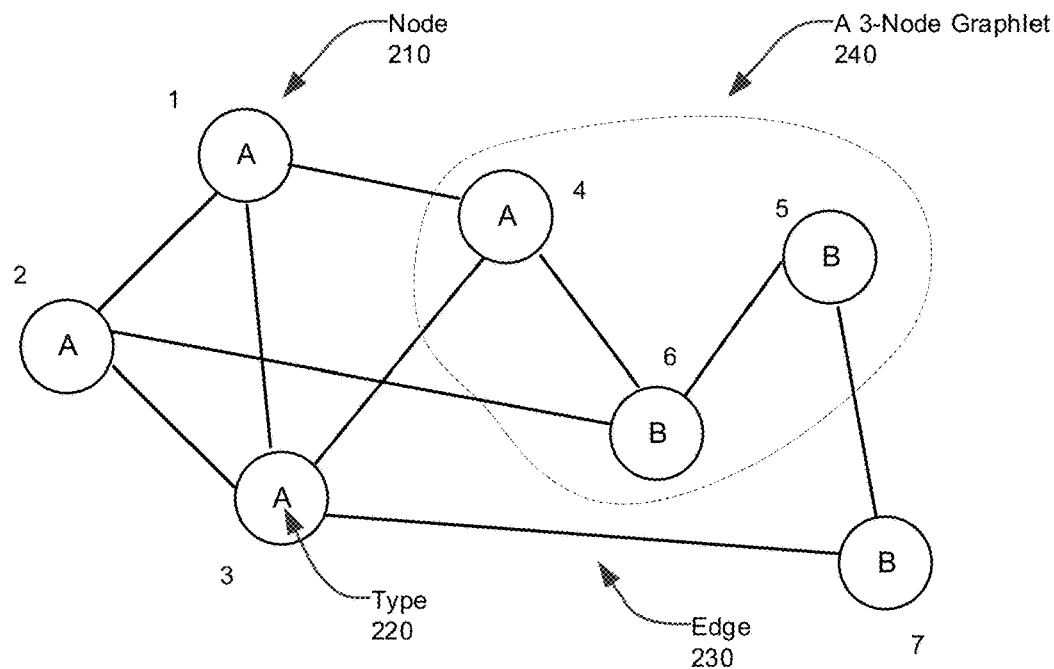
FIGS. 2-5 illustrate examples of heterogeneous networks (typed graphs), in accordance with an embodiment of the present disclosure.
Figure 2:
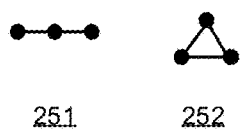
Figure 2:
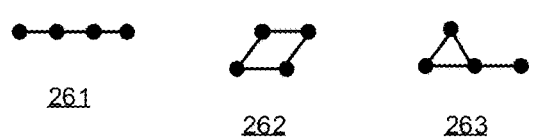
Figure 2:
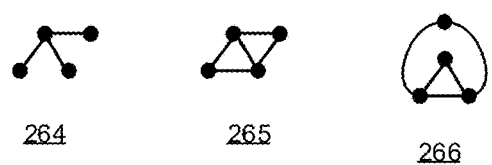

Typed graphlets are the building blocks of heterogeneous networks, and are also sometimes referred to as induced subgraphs, typed motifs, typed network motifs, attributed graphlets, featured graphlets, colored graphlets, labeled graphlets, and heterogeneous graphlets. Typed graphlets are referred to as "typed" because they include the "type" information associated with the nodes and edges. Typed graphlets can be selected to be of any size, comprising some number of nodes (e.g., 2, 3, 4, 5, etc.). One example of a 3-node graphlet 240 is shown in FIG. 2. Typed graphlets represent a subset of the larger heterogeneous network, as will be described in greater detail below.

Figure 1:
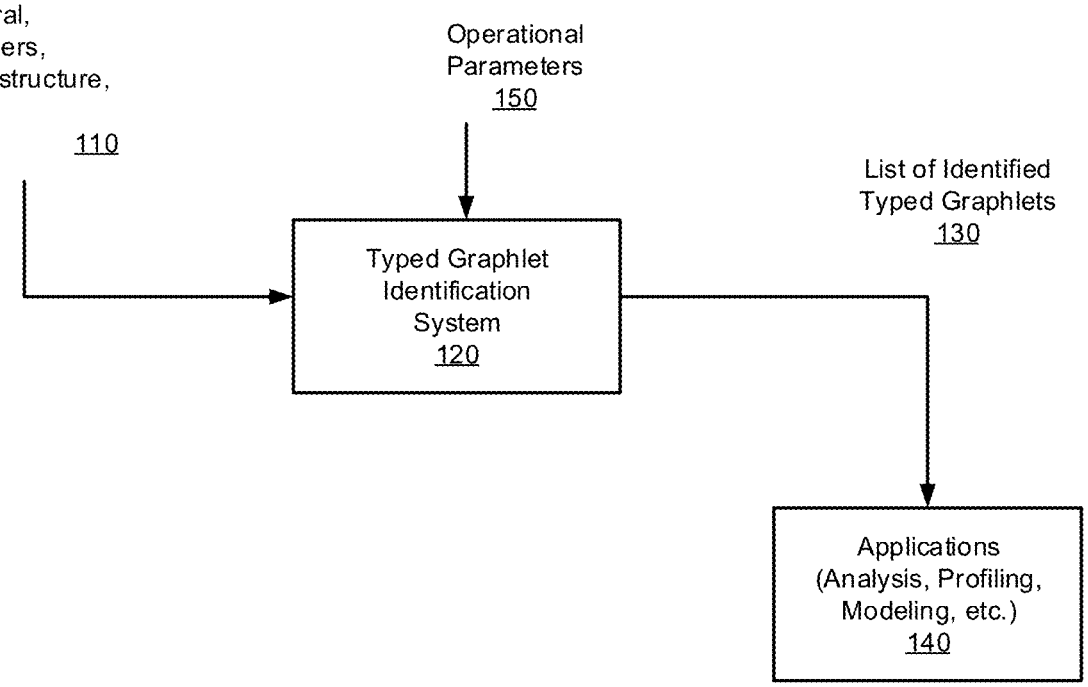
FIG. 1 is a top-level diagram illustrating deployment of a typed graphlet identification system, configured in accordance with an embodiment of the present disclosure.

FIG. 1 is a top-level diagram illustrating deployment of a typed graphlet identification system, configured in accordance with an embodiment of the present disclosure. Any variety of heterogeneous network of interest 110 (e.g., a social network, a neural network, a network of routers, an infrastructure network, etc.) may be provided as input to the typed graphlet identification system 120. The typed graphlet identification system 120 is configured to identify and count the typed graphlets in the heterogeneous network and generate a list (or other suitable description) of the identified typed graphlets 130.

In some embodiments, operational parameters 150 may be specified. The operational parameters may include a desired size of the typed graphlets to be identified. The size may be a selected number of nodes, or a maximum number of nodes of the typed graphlets. For example, for a particular application, the user may be interested in 3-node and 4-node typed graphlets. The operational parameters may also include a list of edges (or pairs of nodes) of the heterogeneous network, over which the search for typed graphlets should be limited. For example, for a particular application, the user may be interested in typed graphlets within a certain region of the heterogeneous network, the region specified by a list of edges or node pairs.

The list of identified graphlets 130 (along with the count and/or other desired statistics) is provided to follow-on applications 140. The follow-on applications 140 are configured to analyze, profile, and/or model the heterogeneous network 110. Examples of such applications may include visitor stitching, user profiling, outlier detection, predictive and descriptive modeling, image processing, computer vision, network alignment, classification, visualization, dynamic network analysis, community detection, role discovery, anomaly detection, and link prediction, to name a few.

Examples of heterogeneous networks and typed graphlets are provided in FIG. 2-6 and described in greater detail below. Identifying and counting these typed graphlets is important for modeling and understanding the fundamental components of these heterogeneous networks. While this has many practical applications, as listed above, identifying and counting typed graphlets in large heterogeneous networks is a challenging task, and existing methods, which typically use brute force enumeration techniques, require tremendous computing resources.

To this end, it would be desirable to have a system that provides for efficient identification and counting of typed graphlets (comprising any selected number of nodes) in a heterogeneous network. Thus, the present disclosure provides a system and methodology for typed graphlet identification and counting, which lends itself to parallel computing and efficient memory utilization.

The system according to an embodiment includes a workload distribution processor configured to divide the computational task up among parallel processors, for example wherein groups of edges are assigned to different processors. The system also includes a 3-node computation module, for each processor, configured to compute 3-node typed graphlets (and counts) occurring between the edges (or pairs of nodes) assigned to that processor.

The system further includes a k-node computation module, for each processor, configured to compute k-node typed graphlets (and counts) occurring between the edges (or pairs of nodes) assigned to that processor. The computation is based on combinatorial relationships between the (k−1)-node typed graphlets, as will be described in greater detail below. For example, the system computes 4-node typed graphlets based on combinatorial relationships between the previously determined 3-node typed graphlets, and so forth. This technique avoids explicit enumeration of many typed graphlets by computing counts based on the combinatorial relationships.

The system further includes a statistic computation processor configured to maintain a count of the identified 3-node type graphlets and k-node typed graphlets. In some embodiments, the statistic computation processor is also configured to compute a frequency (or other desired statistics) associated with each of the k-node typed graphlets and 3-node typed graphlets, and perform predictive and/or descriptive modeling based on the frequency FIGS. 2-5 illustrate examples of heterogeneous networks (typed graphs), in accordance with an embodiment of the present disclosure. FIG. 2 shows a heterogeneous network 200 comprising 7 nodes 210, labeled 1 through 7, with interconnecting edges 230. Each node in this example is a typed node as indicated by the label 220 of 'A' or 'B' associated with that node. One example of a 3-node graphlet 240, of this network 200, is shown within the dotted line.

A network such as this could be used to model a social network, for example, where each node represents a person, each edge represents a relationship between two persons, and the node type represents a political affiliation (i.e., party A or party B) of that person. In a more complex example, the edges could also be typed, for example with a weighting factor to indicate some measure of the strength of the relationship between the two nodes (persons). The network 200 shown in FIG. 2, could also model, for example, tweets sent between people of political affiliations A and B. This example network 200 shows 7 nodes, for simplicity, but actual networks of interest may include thousands or millions (or more) of nodes and edges. Identification and counts (or other statistical measures such as frequencies and distributions) of the typed graphlets of the heterogeneous network may be used for analysis of the underlying characteristics of the social network or the tweeting patterns represented by the network.

FIG. 2 also shows some example varieties of 3-node graphlets 250 and 4-node graphlets 260. These include 3-node paths 251, 4-node paths 261, triangles 252, tailed triangles 263, cliques 266, stars 264, cycles 262, and chorded cycles 265. A more detailed discussion of the typed graphlets, which make up the example heterogeneous network 200, follows below in connection with FIG. 5.

A heterogeneous network may, in general, include many different types associated with nodes and edges, and it is not possible to list them all. Some examples, however, include a webpage type, a network address type, a location type, an Internet session cookie type, a user identity type, and a user characteristic type, all of which may be associated with a node. Additionally, edges may be associated with types such as, for example, directionality, weighting, timestamps, and polarity, etc.

Figure 3:
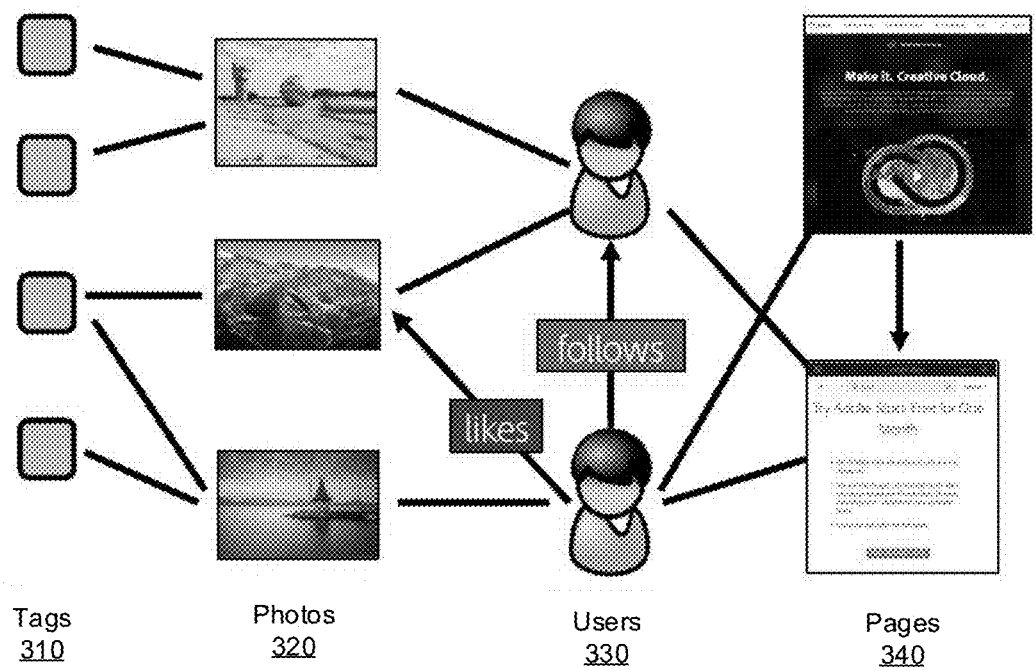
Figure 4:
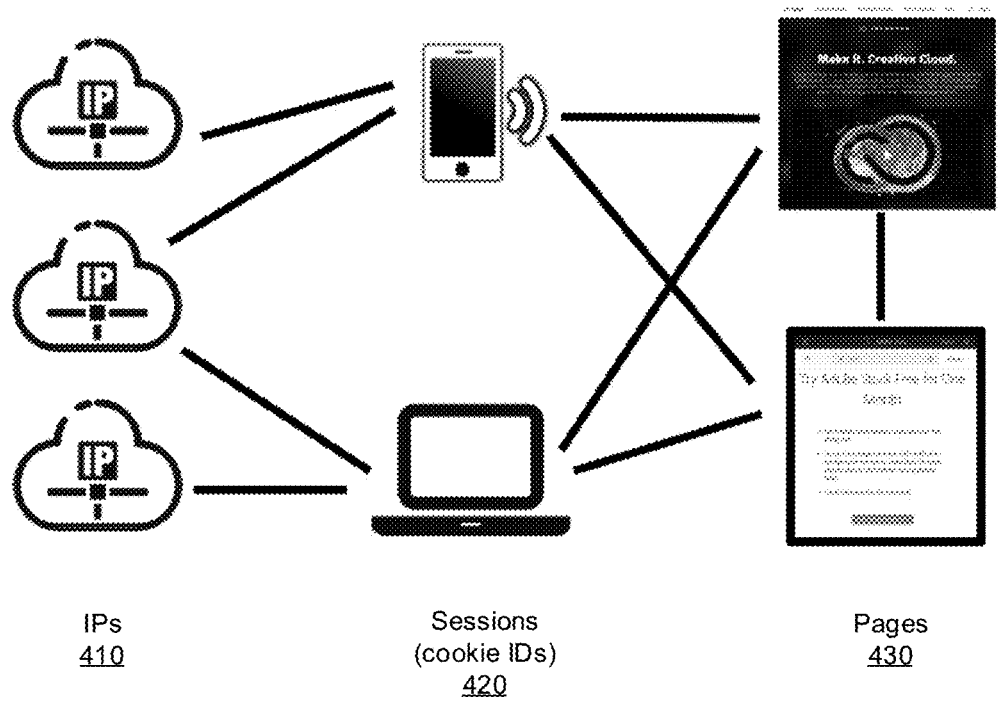

FIG. 3 shows another example of a heterogeneous network comprising nodes of different types, including tags 310, photographs 320, users 330, and webpages 340. Some of the edges are also typed, for example with classifications such as "follows" and "likes." FIG. 4 shows another heterogeneous network comprising nodes of different types, including IP addresses 410, Internet sessions 420 (e.g., cookie IDs), and webpages 430, with a number of interconnecting edges.

Figure 5:
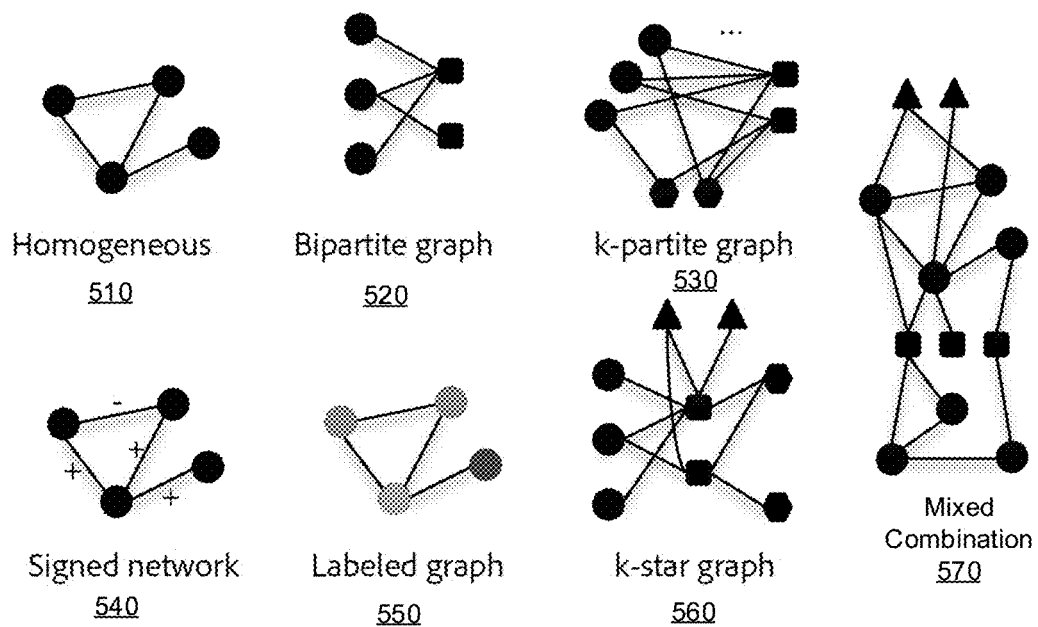

FIG. 5 illustrates a number of different subsets of heterogeneous networks. For example, a 4-node homogeneous (untyped) network 510 may be considered a proper subset of the heterogeneous network. Also shown are a bipartite graph 520 with two types of nodes, a k-partite graph 530 with (in this example) three types of nodes, a signed network 540 with one type of node and two types of (polarized) edges, a labeled graph 550 with three types of nodes, a K-star graph 560 with four types of nodes, and a mixed combination of graphs 570. Many other types are possible.

Figure 6:
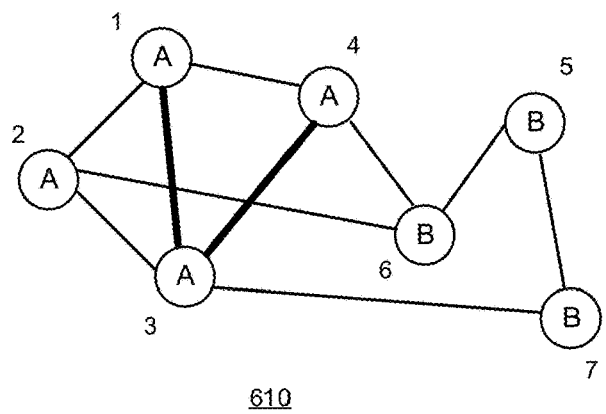
FIG. 6 illustrates identified typed graphlets of a heterogeneous network, in accordance with an embodiment of the present disclosure.
Figure 6:
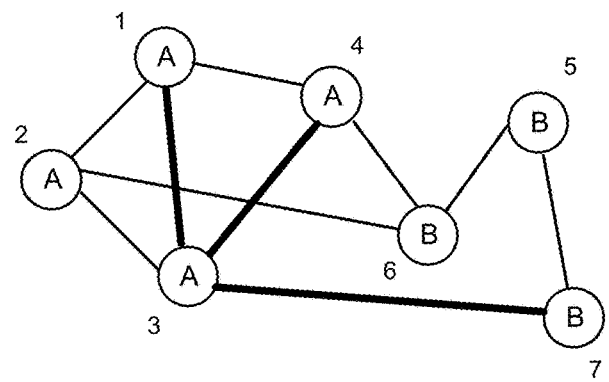
Figure 6:
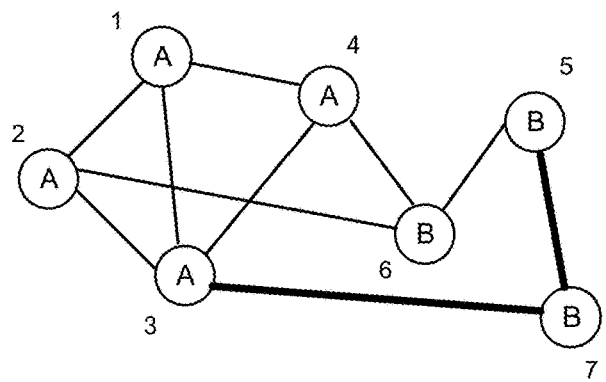
Figure 6:
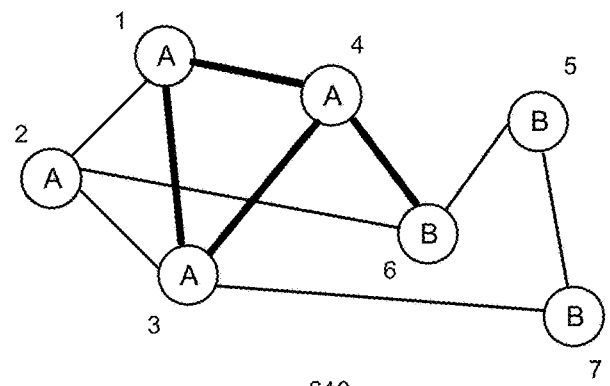

FIG. 6 illustrates a few identified typed graphlets of the heterogeneous network shown in FIG. 1, in accordance with an embodiment of the present disclosure. Four examples 610, 620, 630, 640, are shown of identified typed graphlets resulting from processing of the heterogeneous network 200 of FIG. 2, according to the techniques of an embodiment of the present disclosure. Example 610 shows a three node star (designated by the bolder edge lines) comprising nodes 1, 3, and 4 (all of type A), associated with the edge connecting nodes 3 and 4. Example 620 shows a four node star comprising nodes 1, 3, 4, and 7 (of types A, A, A, and B respectively), associated with the edge connecting nodes 3 and 4. Example 630 shows a three node star comprising nodes 3, 5, and 7 (of types A, B, and B respectively), associated with the edge connecting nodes 5 and 7. Example 640 shows a four node tailed triangle comprising nodes 1, 3, 4, and 6 (of types A, A, A, and B respectively), associated with the edge connecting nodes 4 and 6.

An example of a more complete listing of the results of the processing of this heterogeneous network, in accordance with an embodiment of the present disclosure, is provided in the following tables and described below:

TABLE 1

Edges:

| Nodes i, j | Type Lookup Table index: Count | | | | | | | |
|---|---|---|---|---|---|---|---|---|
| 3, 4 | 0:1, | 1:1, | 2:2, | 3:3, | 4:1, | 5:1, | 6:2, | 7:1 |
| 2, 3 | 0:1, | 1:1, | 2:2, | 3:3, | 4:1, | 5:1, | 6:2, | 7:1 |
| 1, 3 | 1:2, | 2:1, | 3:1, | 6:4, | 5:1 | | | |
| 4, 6 | 2:3, | 8:1, | 9:1, | 4:2, | 3:3, | 6:1, | 10:1 | |
| 3, 7 | 2:3, | 8:1, | 9:1, | 3:5, | 6:2, | 7:1 | | |
| 2, 6 | 2:3, | 8:1, | 9:1, | 4:2, | 3:3, | 6:1, | 10:1 | |
| 1, 2 | 1:1, | 0:1, | 2:1, | 3:1, | 4:1, | 5:1, | 6:2 | |
| 1, 4 | 1:1, | 0:1, | 2:1, | 3:1, | 4:1, | 5:1, | 6:2 | |
| 5, 6 | 8:2, | 11:1, | 9:3, | 3:4, | 10:1 | | | |
| 5, 7 | 8:1, | 11:1, | 9:3, | 3:3 | | | | |

TABLE 2

Type Lookup Table:

| Index | Graphlet | Node Types |
|---|---|---|
| 0, | three node star, | A-A-A |
| 1, | triangle, | A-A-A |
| 2, | three node star, | B-A-A |
| 3, | four node path, | B-B-A-A |
| 4, | four node cycle, | B-A-A-A |
| 5, | four node chordal cycle, | A-A-A-A |
| 6, | four node tailed triangle, | B-A-A-A |
| 7, | four node star, | B-A-A-A |
| 8, | three node star, | B-B-A |
| 9, | four node path, | B-B-B-A |
| 10, | four node star, | B-B-A-A |
| 11, | three node star, | B-B-B |

Table 1 provides graphlet identification results for each edge of the heterogeneous network defined by pairs of nodes i, j. So, for example, the first line provides graphlet identification results for the edge between nodes 3 and 4. These results are in the form of a list of pairs of numbers, separated by a colon. The first number is an index into the table 2, the type lookup table, which provides the characterization of the typed graphlet, and the second number is a count value (e.g., number of occurrences) for that typed graphlet. Thus, the first pair of values, 0:1, indicates that there is a typed graphlet described by the index 0 entry of the type lookup table, and that typed graphlet has a count of 1. The index 0 entry of the type lookup table specifies a "three node star" graphlet, for which all of the nodes are type A. This particular graphlet is illustrated as example 610, discussed previously. Similarly, example 620, can be found in the table, for node pairs 3, 4, as entry 7:1. Example 630, can be found in the table, for node pairs 5, 7, as entry 8:1, and example 640, can be found in the table, for node pairs 4, 6, as entry 6:1.

One can proceed through the table 1 in this manner to obtain every identified graphlet and the associated count for that graphlet. As a final example, the last entry for the edge between nodes 5 and 7 is shown as 3:3, which indicates 3 occurrences of a four node path with node types B, B, A, and A. As can be seen, from these results, the number of graphlets is large for even a small network of only 7 nodes and 2 types, as in this example.

The foregoing tables are just one example of a format for providing the results of graphlet identification processing, according to an embodiment. It will be appreciated that other suitable formats may also be employed.

As previously noted, the present disclosure provides a system and methodology for efficient identification and counting of typed graphlets in a heterogeneous network. In more detail, a methodology implementing the techniques according to an embodiment includes identifying k-node typed graphlets (wherein k is an integer greater than 3), occurring between any two selected nodes (node i and node j) of the heterogeneous network. The nodes are connected by one or more edges. The identification is based on combinatorial relationships between (k–1)-node typed graphlets occurring between the two selected nodes, as will be explained in greater detail below. The method further includes identifying 3-node typed graphlets occurring between the two selected nodes by computing, for each edge of the heterogeneous network connecting nodes i and j: (1) a set of nodes that form typed triangles with nodes i and j; (2) a set of nodes that form typed 3-node stars centered at node i; (3) a set of nodes that form typed 3-node stars centered at node j; and (4) a set of nodes that form typed 3-paths with nodes i and j. The method further includes maintaining a count of the identified k-node and 3-node typed graphlets.

It will be appreciated that the identification of 2-node typed graphlets is a trivial operation, since the graphlet comprises just the 2 nodes, the connecting edge, and the associated types of the nodes and the edge.

Thus, the foregoing provides an efficient method for identifying and counting typed graphlets in a heterogeneous network. These techniques offer significant advantages over existing methods that fail to leverage the combinatorial relationships between lower order graphlets (i.e., graphlets of fewer nodes), and thus need to enumerate all nodes in the surrounding subgraphs, which is computationally expensive and memory intensive. Numerous configurations and variations will be apparent in light of this disclosure.

System Architecture

Figure 7:
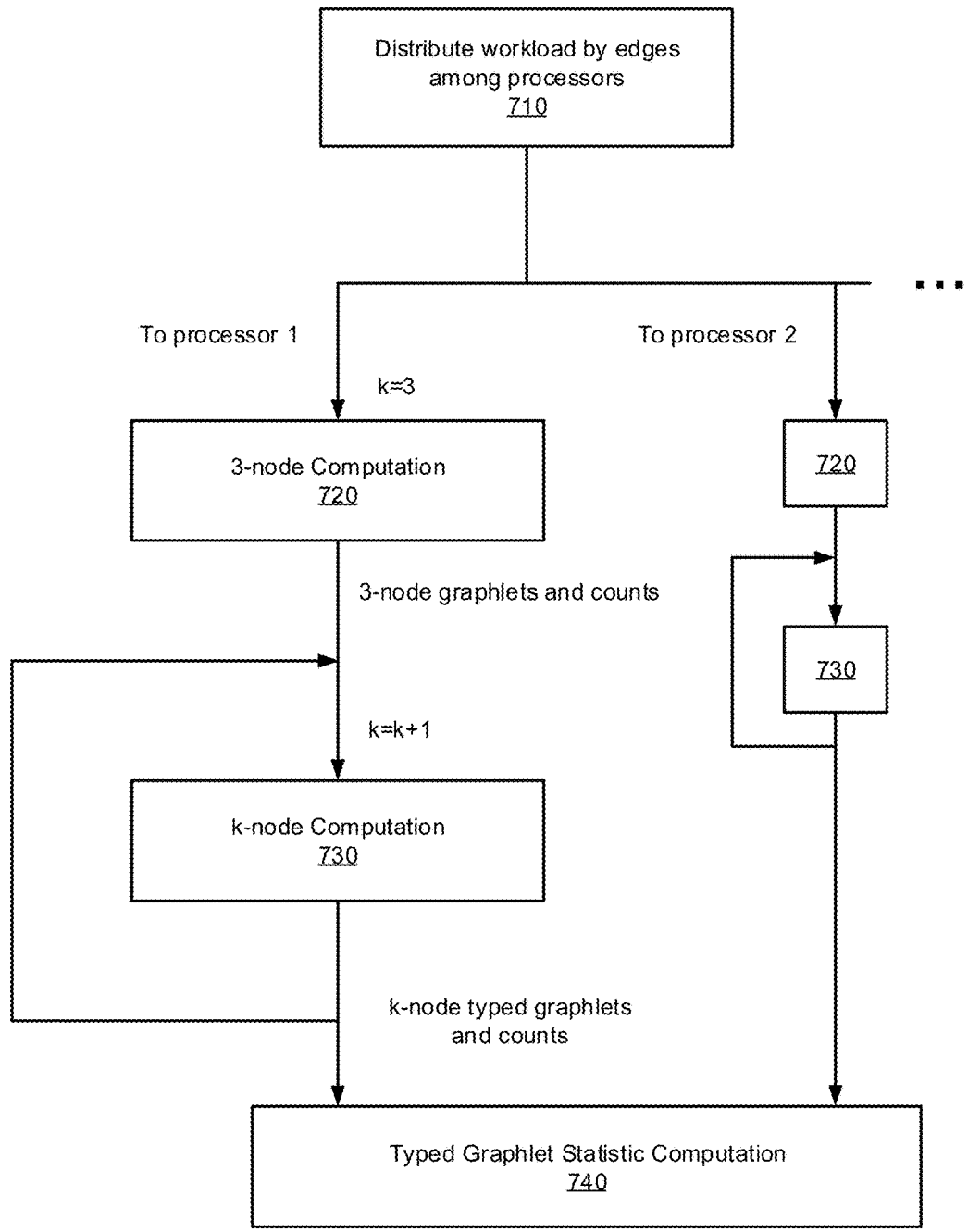
FIG. 7 is a block diagram of a typed graphlet identification system, configured in accordance with an embodiment of the present disclosure.

FIG. 7 is a block diagram of a typed graphlet identification system 120, configured in accordance with an embodiment of the present disclosure. The typed graphlet identification system 120 is shown to include a workload distribution module 710, a 3-node computation module 720, a k-node computation module 730, and a typed graphlet statistic computation module 740.

The typed graphlet identification system 120 is configured to identify and count typed graphlets between any selected pairs of nodes (e.g., graphlets associated with edges) of the heterogeneous network. Thus, in some embodiments, the system may operate on the entire heterogeneous network, or on a selected subset of the heterogeneous network thereof. In some embodiments, the workload distribution module 710 is configured to distribute the computational workload among a plurality of processors or processing elements in an asynchronous and lock-free (e.g., non-blocking) manner. This may be accomplished by dividing the workload up by edges or groups of edges. For example, if there are N processing elements, and it is desired to find all typed graphlets associated with M edges of the heterogeneous network, then M/N edges may be assigned to each processing element.

The 3-node computation module 720 is configured to compute/identify 3-node typed graphlets associated with an edge of the heterogeneous network, as will be described in greater detail below.

The k-node computation module 730 is configured to compute/identify k-node typed graphlets associated with the edge of the heterogeneous network, based on combinatorial relationships between (k–1)-node typed graphlets, as will be described in greater detail below. The k-node computation module 730 may be employed repetitively for increasing values of k, starting from k equals 4, up to any desired limit.

Only those graphlets having non-zero counts are stored, which provides significant memory savings.

The typed graphlet statistic computation module 740 is configured to compute statistics on the identified typed graphlets, including counts, frequencies, distributions, and the like, which are useful for further analysis of the fundamental properties of the heterogeneous network.

Methodology

Figure 8:
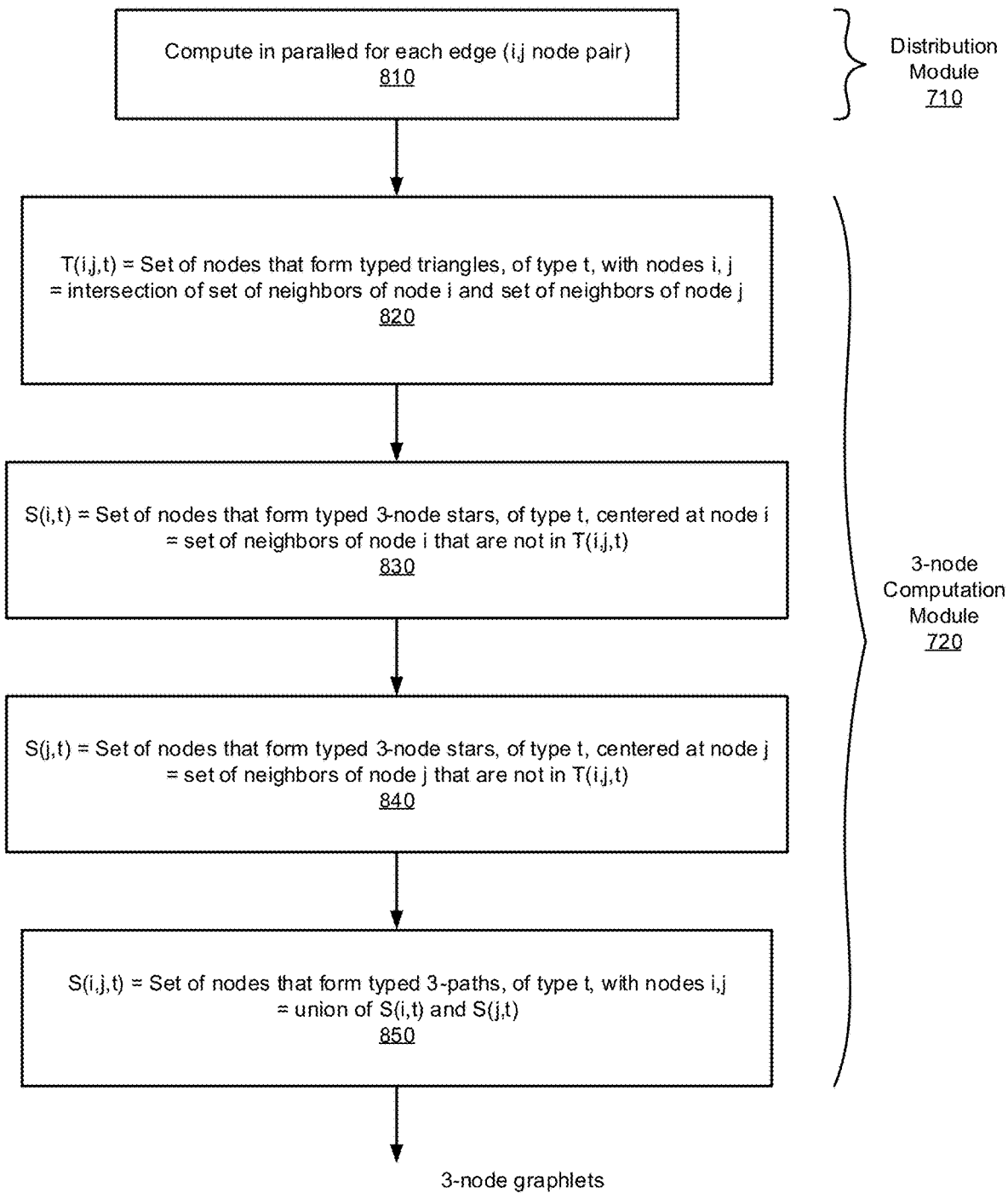
FIG. 8 is a flowchart illustrating a method for identifying typed 3-node graphlets, in accordance with an embodiment of the present disclosure.

FIG. 8 is a flowchart 800 illustrating a method for identifying typed 3-node graphlets, in accordance with an embodiment of the present disclosure. As can be seen, the method is described with reference to the configuration of typed graphlet identification system 120, of FIG. 7, and the distribution module 710, and the 3-node computation module 720. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration. In some embodiments, the operations described below can be performed in any sequential order, or jointly, or in other combinations of these two approaches.

The method commences, at operation 810, by selecting edges of the heterogeneous network, for which typed graphlets are to be computed. The edges can be defined by an (i, j) node pair. The graphlet computations for each edge can be computed in parallel, allowing for a distributed processing solution.

The method continues, at operation 820, by computing a set of nodes that form typed triangles of type t with nodes i and j. This set is denoted as T(i,j,t), and is formed from an intersection of a set of neighbors of node and a set of neighbors of node j.

At operation 830, a set of nodes are computed that form typed 3-node stars of type t centered at node i. This set is denoted as S(i,t), and is formed from a set of neighbors of node i that are not in the set T(i,j,t).

At operation 840, a set of nodes are computed that form typed 3-node stars of type t centered at node j. This set is denoted as S(j,t), and is formed from a set of neighbors of node j that are not in the set T(i,j,t).

At operation 850, a set of nodes are computed that form typed 3-paths of type t with nodes i and j. This set is denoted as S(i,j,t), and is formed from a union of sets S(i,t) and S(j,t).

In some embodiments, additional operations are performed. For example, in one embodiment, counts are maintained of the identified 3-node typed graphlets. Some heterogeneous networks may include timestamps associated with edges are nodes of the network as one of the types. In such case, the count of the identified graphlets may be maintained over (or restricted to) a selected period of time, based on those timestamps.

Figure 9:
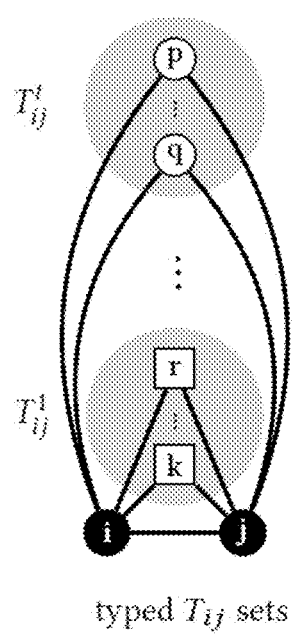
FIG. 9 illustrates typed 3-node sets, in accordance with an embodiment of the present disclosure.
Figure 9:
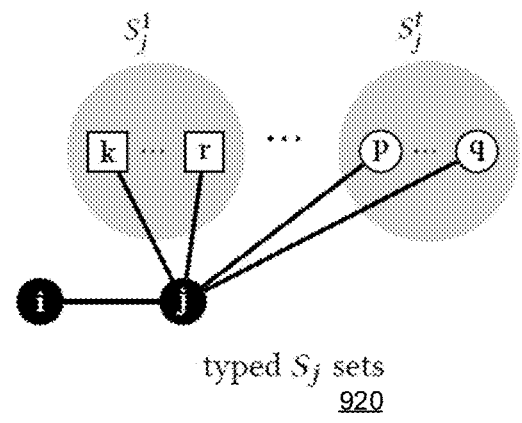
Figure 9:
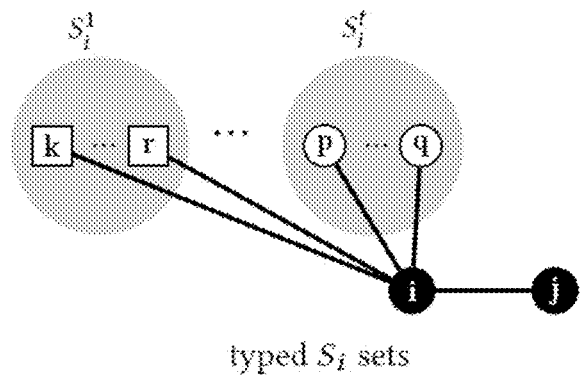

FIG. 9 illustrates examples of typed 3-node sets as generated by the operations described above in connection with FIG. 8, in accordance with an embodiment of the present disclosure. Examples of typed sets T(i,j,t) are shown as triangles 910. All graphlets from these sets include nodes i and j. Graphlets that include third nodes r and k are shown to be of type 1, while graphlets that include third nodes q and p are shown to be of type t.

Examples of typed sets S(j,t) are shown as stars 920 comprising nodes i and j, centered at node j. Graphlets that include third nodes r and k are shown to be of type 1, while graphlets that include third nodes q and p are shown to be of type t.

Examples of typed sets S(i,t) are shown as stars 930 comprising nodes i and j, centered at node i. Graphlets that include third nodes r and k are shown to be of type 1, while graphlets that include third nodes q and p are shown to be of type t.

Figure 10:
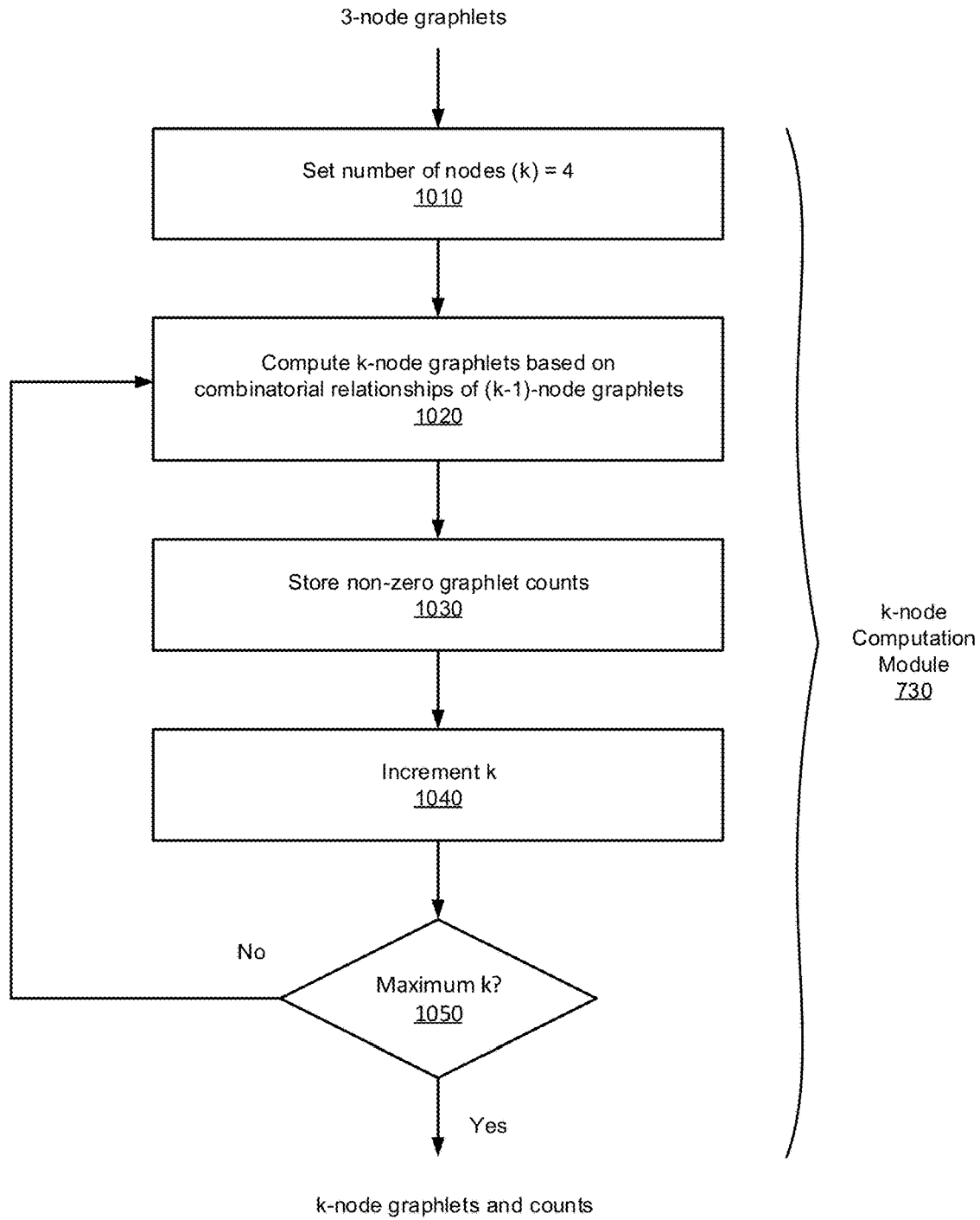
FIG. 10 is a flowchart illustrating a method for identifying typed k-node graphlets, in accordance with an embodiment of the present disclosure.

FIG. 10 is a flowchart illustrating a method for identifying typed k-node graphlets, for a selected edge, in accordance with an embodiment of the present disclosure. As can be seen, the method is described with reference to the configuration of typed graphlet identification system 120, of FIG. 7, and the k-node computation module 730. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration. In some embodiments, the operations described below can be performed in any sequential order, or jointly, or in other combinations of these two approaches.

The method commences, at operation 1010, by initializing the number of nodes, k, to 4.

The method continues, at operation 1020, by computing (identifying and counting) k-node typed graphlets associated with the edge of the heterogeneous network, based on combinatorial relationships between the previously identified (k−1)-node typed graphlets, as will be described in greater detail below.

At operation 1030, the computed k-node typed graphlets having non-zero counts are stored, and at operation 1040, k is incremented. At operation 1050, k is tested to determine if the maximum node count has been reached. If not, the process is repeated, using the incremented value of k, by looping back to operation 1020.

Figure 11:
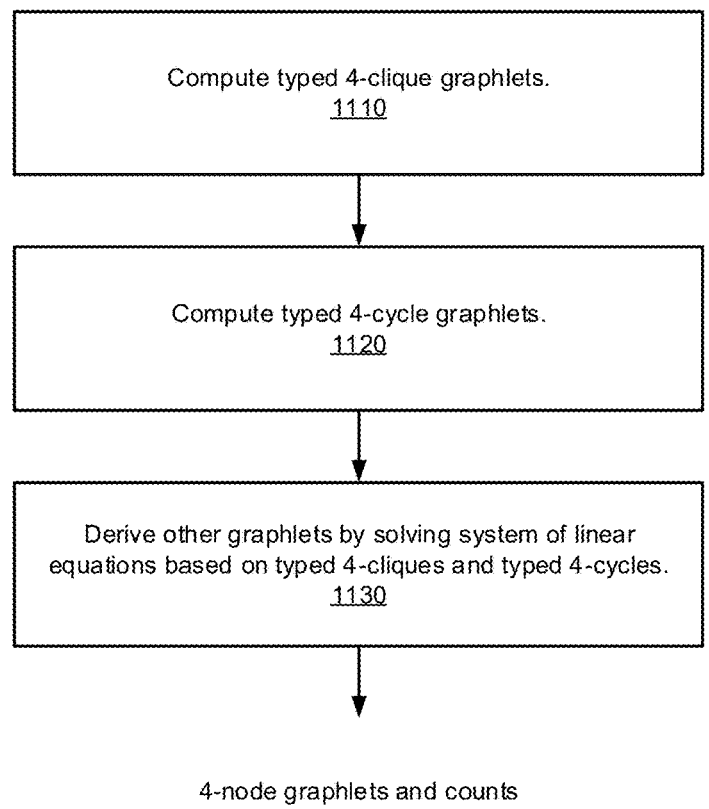
FIG. 11 is a flowchart illustrating a method for computing k-node graphlets based on combinatorial relationships of (k−1)-node graphlets, in accordance with an embodiment of the present disclosure.

FIG. 11 is a flowchart illustrating a method for computing k-node graphlets based on combinatorial relationships of (k−1)-node graphlets, for the example case of k equal to 4, in accordance with an embodiment of the present disclosure. Note that the various functions depicted in the method do not need to be assigned to the specific example modules shown.

graphlets. The system of linear equations is shown in Table 4, below, with Table 3 providing a legend of the mathematical symbols used.

TABLE 3

| | |
|---|---|
| G | graph |
| H, F | graphlet of G |
| N, M | number of nodes N = \|V\| and edges M = \|E\| in the graph |
| K | size of a network motif (# nodes) |
| L | number of types (i.e., colors, labels) |
| $\mathcal{H}$ | set of all untyped motifs in G |
| $\mathcal{H}_T$ | set of all typed motifs in G |
| T | # of typed motifs T = \|$\mathcal{H}_T$\| observed in G with L types |
| $T_{max}$ | # of possible typed motifs with L types, hence T ≤ $T_{max}$ |
| $T_H$ | # of different typed motifs for a particular motif H ∈ $\mathcal{H}$ |
| $\mathcal{T}_V$ | set of node types in G |
| $\mathcal{T}_E$ | set of edge types in G |
| $\phi$ | type function $\Phi : V \to \mathcal{T}_V$ |
| $\xi$ | type function $\xi : E \to \mathcal{T}_E$ |
| t | K-dimensional type vector t = [$\phi w_1 \ldots \phi w_K$] |
| $f_{ij}(H, t)$ | # of instances of motif H that contain nodes i and j with type vector t |
| $\mathbb{F}$ | an arbitrary typed motif hash function (Section 3.6) |
| $\Delta$ | maximum degree of a node in G |
| $\Gamma_i^t$ | set of neighbors of node i with type t |
| $d_i^t$ | degree of node i with type t, $d_i^t = |\Gamma_i^t|$ |
| $T_{ij}^t$ | set of nodes of type t that form typed triangles with i and j |
| $S_i^t, S_j^t$ | set of nodes of type t that form typed 3-node stars centered at i (or j) |
| $M_{ij}$ | set of typed motifs for a given pair of nodes (i, j) |
| $X_{ij}$ | nonzero (typed-motif, count) pairs for edge (i, j) ∈ E |
| $\Psi$ | hash table for checking whether a node is connected to i or j and its "relationship" (e.g., $\lambda_1, \lambda_2, \lambda_3$) in constant time |

TABLE 4

| TYPED MOTIF H | ORBIT | $f_{ij}(H, t) = |\{\{i, j, w_k, w_r\}| w_k \in P \land w_r \in Q \land I\{(w_k, w_r) \in E\} \land w_r \neq w_k \land t = [\phi i\ \phi j\ \phi w_k\ \phi w_r]\}|$ |
|---|---|---|
| 3-path | | $f_{ij}(g_1, t) = |\{\{i, j, w_k\}|(w_k \in S_i^t \cup w_k \in S_j^t) \land t = [\phi i\ \phi j\ \phi w_k]\}|$ |
| triangle | | $f_{ij}(g_2, t) = |\{\{i, j, w_k\}|w_k \in T_{ij}^t \land t = [\phi i\ \phi j\ \phi w_k]\}|$ |
| 4-path | edge | $f_{ij}(g_3, t) = |\{\{i, j, w_k, w_r\}|w_k \in S_i^t \land w_r \in I^t \land (w_k, w_r) \in E \land t = [\phi i\ \phi j\ \phi w_k\ \phi w_r]\}|$ |
| | center | $f_{ij}(g_4, t) = |\{\{i, j, w_k, w_r\}|(w_k \in S_j^t) \land (w_r \in S_i^t) \land (w_k, w_r) \notin E \land t = [\phi i\ \phi j\ \phi w_k\ \phi w_r]\}|$ |
| 4-star | | $f_{ij}(g_5, t) = |\{\{i, j, w_k, w_r\}|w_k \in S_i^t \land w_r \in S_i^t \land (w_k, w_r) \notin E \land t = [\phi i\ \phi j\ \phi w_k\ \phi w_r]\}|$ |
| 4-cycle | | $f_{ij}(g_6, t) = |\{\{i, j, w_k, w_r\}|w_k \in S_j^t \land w_r \in S_i^t \land (w_k, w_r) \in E \land t = [\phi i\ \phi j\ \phi w_k\ \phi w_r]\}|$ |
| tailed-triangle | tail-edge | $f_{ij}(g_7, t) = |\{\{i, j, w_k, w_r\}|w_k \in S_i^t \land w_r \in S_i^t \land w_r \neq w_k \land (w_k, w_r) \in E \land t = [\phi i\ \phi j\ \phi w_k\ \phi w_r]\}|$ |
| | center | $f_{ij}(g_8, t) = |\{\{i, j, w_k, w_r\}|w_k \in T_{ij}^t \land w_r \in I^t \land (w_k, w_r) \in E \land t = [\phi i\ \phi j\ \phi w_k\ \phi w_r]\}|$ |
| | tri-edge | $f_{ij}(g_9, t) = |\{\{i, j, w_k, w_r\}|w_k \in T_{ij}^t \land w_r \in S_i^t \land (w_k, w_r) \notin E \land t = [\phi i\ \phi j\ \phi w_k\ \phi w_r]\}|$ |
| chordal-cycle | edge | $f_{ij}(g_{10}, t) = |\{\{i, j, w_k, w_r\}|w_k \in T_{ij}^t \land w_r \in (S_i^t \cup S_j^t) \land w_r \neq w_k \land (w_k, w_r) \in E \land t = [\phi i\ \phi j\ \phi w_k\ \phi w_r]\}|$ |
| | center | $f_{ij}(g_{11}, t) = |\{\{i, j, w_k, w_r\}|w_k \in T_{ij}^t \land w_r \in T_{ij}^t \land w_r \neq w_k \land (w_k, w_r) \notin E \land t = [\phi i\ \phi j\ \phi w_k\ \phi w_r]\}|$ |
| 4-clique | | $f_{ij}(g_{12}, t) = |\{\{i, j, w_k, w_r\}|w_k \in T_{ij}^t \land w_r \in T_{ij}^t \land w_r \neq w_k \land (w_k, w_r) \in E \land t = [\phi i\ \phi j\ \phi w_k\ \phi w_r]\}|$ |

To this end, the example methodology depicted is provided to give one example embodiment and is not intended to limit the methodology to any particular physical or structural configuration. In some embodiments, the operations described below can be performed in any sequential order, or jointly, or in other combinations of these two approaches.

The method commences, at operation 1110, by computing typed 4-node clique graphlets.

The method continues, at operation 1120, by computing typed 4-node cycle graphlets.

At operation 1130, additional graphlets are derived by solving a system of linear equations based on the computed typed 4-node clique graphlets and typed 4-node cycle Example Algorithm Implementations In some embodiments, the processing operations described above, to identify and count the typed graphlets of a heterogeneous network, may be performed by the following example algorithm implementations which are provided in the form of mathematical pseudo code. It will be appreciated, however, that this is just one example and that many other coding approaches may be used. To that end, algorithm implementation 1 (below) generally performs the top-level processing described in association with FIG. 7, including blocks 710, and 720. Algorithm implementations 2 and 3 perform the processing associated with block 730 of FIG. 7, and algorithm implementation 4 performs the processing associated with block 740 of FIG. 7.

Algorithm 1 Heterogeneous Graphlets

Input: a graph G
1  Initialize $\psi$ to all zeros
2  parallel for each (i, j) $\in$ E in order do
3    Set x = 0 to a vector of all zeros and $X_{ij} = \emptyset$
4    $\mathcal{M}_{ij} = \emptyset$                                               ▷ set of typed motifs occurring between i and j
5    for k $\in \Gamma_i$ do if k $\neq$ j then $\psi$(k) = $\lambda_1$
6    for k $\in \Gamma_j$ do
7      if k = i then continue
8      if $\psi$(k) = $\lambda_1$ then                                            ▷ typed triangle motif
9        $T_{ij} \leftarrow T_{ij} \cup \{k\}$, $|T_{ij}^{\phi k}| = |T_{ij}^{\phi k}| + 1$, set $\psi$(k) = $\lambda_3$
10       $\langle x, \mathcal{M}_{ij} \rangle$ = UPDATE(x, $\mathcal{M}_{ij}$, $\mathcal{F}(g_2, \Phi_i, \Phi_j, \Phi_k, 0)$)
11     else                                                                      ▷ typed 3-path centered at node j
12       $S_j \leftarrow S_j \cup \{k\}$, $|S_j^{\phi k}| = |S_j^{\phi k}| + 1$, and set $\psi$(k) = $\lambda_2$
13       $\langle x, \mathcal{M}_{ij} \rangle$ = UPDATE(x, $\mathcal{M}_{ij}$, $\mathcal{F}(g_1, \Phi_i, \Phi_j, \Phi_k, 0)$)
14   for k $\in (\Gamma_i \setminus T_{ij})$ do                                   ▷ Set of typed 3-path nodes centered at i
15     $S_i \leftarrow S_i \cup \{k\}$ and $|S_j^{\phi k}| = |S_j^{\phi k}| + 1$
16     $\langle x, \mathcal{M}_{ij} \rangle$ = UPDATE(x, $\mathcal{M}_{ij}$, $\mathcal{F}(g_1, \Phi_i, \Phi_j, \Phi_k, 0)$)
17   Given $S_i$ and $S_j$, use Algorithm 2 to derive a few typed path-based graphlets
18   Given $T_{ij}$, use Algorithm 3 to derive a few typed triangle-based graphlets
19   for t, t' $\in \{1, \ldots, L\}$ such that t $\leq$ t' do
20     Derive remaining typed graphlet orbits o(1) constant time via Eq. 1-4 and update counts x
       and set of motifs $\mathcal{M}_{ij}$
21   for c $\in \mathcal{M}_{ij}$ do
22     $X_{ij} = X_{ij} \cup \{(c, x_c)\}$                                        ▷ store nonzero typed/colored graphlet counts
23   Reset $\psi$ to all zero
24 end parallel
25 Merge local typed motifs found by each worker to obtain $\mathcal{M}$
26 return X (all typed motif counts for every edge in G) and the set of all typed motifs $\mathcal{M}$ occurring in G

---

Algorithm 2 Typed Path-based Graphlets

Input: a graph G = (V, E, $\Phi$, $\zeta$), an edge (i, j), sets of nodes $S_i$ and $S_j$ that form 3-paths centered at i and j,
respectively, a type motif count vector x for (i, j), and set $\mathcal{M}_{ij}$ of unique typed motifs for i and j.
1  for each $w_k \in S_i$ in order $w_1, w_2, \ldots$ of $S_i$ do
2    for $w_r \in \Gamma_{w_k}$ do
3      if ($w_r$ = i) v ($w_r$ = j) continue
4      if $w_r \notin \Gamma_i \cup \Gamma_j$ then                                ▷ $\psi(w_r)$ = 0, typed 4-path-edge orbit
5        $\langle x, \mathcal{M}_{ij} \rangle$ = UPDATE(x, $\mathcal{M}_{ij}$, $\mathcal{F}(g_3, \Phi_i, \Phi_j, \Phi_{w_k}, \Phi_{w_r})$)
6      else if $w_r \in S_i \wedge w_r \leq w_k$ then                             ▷ $\psi(w_r)=\lambda_1$, typed tailed-tri (tail)
7        $\langle x, \mathcal{M}_{ij} \rangle$ = UPDATE(x, $\mathcal{M}_{ij}$, $\mathcal{F}(g_7, \Phi_i, \Phi_j, \Phi_{w_k}, \Phi_{w_r})$)
8  for each $w_k \in S_j$ in order $w_1, w_2, \ldots$ of $S_j$ do
9    for $w_r \in \Gamma_{w_k}$ do
10     if ($w_r$ = i) v ($w_r$ = j) continue
11     if $w_r \notin (\Gamma_i \cup \Gamma_j)$ then                              ▷ $\psi(w_r)$=0, typed typed 4-path-edge
12       $\langle x, \mathcal{M}_{ij} \rangle$ = UPDATE(x, $\mathcal{M}_{ij}$, $\mathcal{F}(g_3, \Phi_i, \Phi_j, \Phi_{w_k}, \Phi_{w_r})$)
13     else if $w_r \in S_j \wedge w_r \leq w_k$ then                             ▷ $\psi(w_r)=\lambda_2$, typed tailed-tri (tail)
14       $\langle x, \mathcal{M}_{ij} \rangle$ = UPDATE(x, $\mathcal{M}_{ij}$, $\mathcal{F}(g_7, \Phi_i, \Phi_j, \Phi_{w_k}, \Phi_{w_r})$)
15     else if $w_r \in S_i$ then                                                 ▷ $\psi(w_r) = \lambda_1$, typed 4-cycle
16       $\langle x, \mathcal{M}_{ij} \rangle$ = UPDATE(x, $\mathcal{M}_{ij}$, $\mathcal{F}(g_6, \Phi_i, \Phi_j, \Phi_{w_k}, \Phi_{w_r})$)
17 return set of typed motifs $\mathcal{M}_{ij}$ between i and j and x

---

Algorithm 3 Typed Path-based Graphlets

Input: a graph G = (V, E, $\Phi$, $\zeta$), an edge (i, j), set of nodes $T_{ij}$ that form triangles with i and j, sets of nodes
$S_i$ and $S_j$ that form 3-paths centered at i and j, respectively, a typed motif count vector x for (i, j), and set
$\mathcal{M}_{ij}$ of using unique typed motifs for i and j.
1  for each $w_k \in T_{ij}$ in order $w_1, w_2, \ldots$ of $T_{ij}$ do
2    for $w_r \in \Gamma_{w_k}$ do
3      if $w_r \in T_{ij} \wedge w_r \leq w_k$ then                               ▷ $\psi(w_r)=\lambda_3$, typed 4-clique
4        $\langle x, \mathcal{M}_{ij} \rangle$ = UPDATE(x, $\mathcal{M}_{ij}$, $\mathcal{F}(g_{12}, \Phi_i, \Phi_j, \Phi_{w_k}, \Phi_{w_r})$)
5      else if $w_r \in S_i \cup S_j$ then                                        ▷ $\psi(w_r)=\lambda_1 v \lambda_2$, typed chord-cycle-edge
6        if ($w_r$ = i) v ($w_r$ = j) continue
7        $\langle x, \mathcal{M}_{ij} \rangle$ = UPDATE(x, $\mathcal{M}_{ij}$, $\mathcal{F}(g_{10}, \Phi_i, \Phi_j, \Phi_{w_k}, \Phi_{w_r})$)
8      else if $w_r \notin (\Gamma_i \cup \Gamma_j)$ then                         ▷ typed tailed-tri-center
9        if ($w_r$ = i) v ($w_r$ = j) continue
10       $\langle x, \mathcal{M}_{ij} \rangle$ = UPDATE(x, $\mathcal{M}_{ij}$, $\mathcal{F}(g_8, \Phi_i, \Phi_j, \Phi_{w_k}, \Phi_{w_r})$)
11 return set of typed motifs $\mathcal{M}_{ij}$ between i and j and x ---
Algorithm 4 Update Typed Graphlets. Add typed graphlet
(with hash c) to $\mathcal{M}_{ij}$ if c $\notin \mathcal{M}_{ij}$ and increment
$x_c$ (frequency of that typed graphlet for a given edge).
---

1: procedure UPDATE(x, $\mathcal{M}_{ij}$, c = $\mathcal{F}$(g, $\Phi_i$, $\Phi_j$, $\Phi_k$, $\Phi_r$))
2:  if c $\notin \mathcal{M}_{ij}$ then
3:    $\mathcal{M}_{ij} \leftarrow \mathcal{M}_{ij} \cup \{c\}$ and set $x_c = 0$
4:    $x_c = x_c + 1$
5:  return updated set of typed graphlets $\mathcal{M}_{ij}$ and counts x $$f_{ij}(g_4, t) = \begin{cases} (|S_i^t| \cdot |S_j^t|) - f_{ij}(g_6, t) & \text{if } t = t' \\ (|S_i^t| \cdot |S_j^{t'}|) + \\ (|S_i^{t'}| \cdot |S_j^t|) - f_{ij}(g_6, t) & \text{otherwise} \end{cases} \quad \text{Equation (1)}$$

$$f_{ij}(g_5, t) = \begin{cases} \binom{|S_i^t|}{2} \cdot \binom{|S_j^t|}{2} - f_{ij}(g_7, t) & \text{if } t = t' \\ (|S_i^t| \cdot |S_i^{t'}|) + \\ (|S_j^t| \cdot |S_j^{t'}|) - f_{ij}(g_7, t) & \text{otherwise} \end{cases} \quad \text{Equation (2)}$$

$$f_{ij}(g_9, t) = \begin{cases} (|T_{ij}^t| \cdot (|S_i^t| + |S_j^t|)) - f_{ij}(g_{10}, t) & \text{if } t = t' \\ (|T_{ij}^t| \cdot (|S_i^{t'}| + |S_j^{t'}|)) + \\ (|T_{ij}^{t'}| \cdot (|S_i^t| + |S_j^t|)) - f_{ij}(g_{10}, t) & \text{otherwise} \end{cases} \quad \text{Equation (3)}$$

$$f_{ij}(g_{11}, t) = \begin{cases} \binom{|T_{ij}^t|}{2} - f_{ij}(g_{12}, t) & \text{if } t = t' \\ (|T_{ij}^t| \cdot |T_{ij}^{t'}|) - f_{ij}(g_{12}, t) & \text{otherwise} \end{cases} \quad \text{Equation (4)}$$

Example Platform

Figure 12:
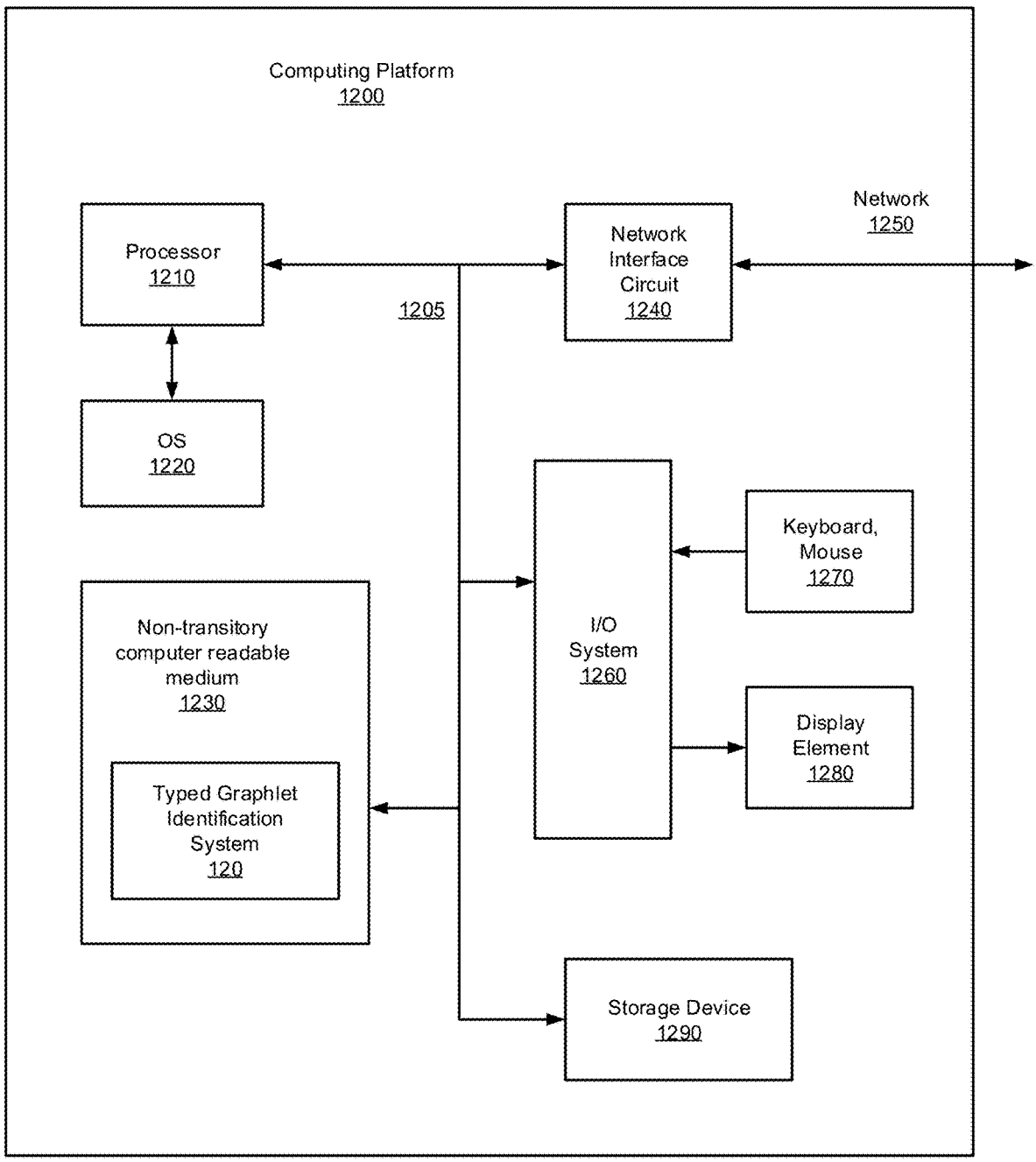
FIG. 12 is a block diagram schematically illustrating a computing platform configured to perform any of the techniques as variously described in this disclosure, configured in accordance with an embodiment of the present disclosure.

FIG. 12 is a block diagram schematically illustrating a computing platform 1200 configured to perform any of the techniques as variously described in this disclosure, configured in accordance with an embodiment of the present disclosure. For example, in some embodiments, the typed graphlet identification system 120 of FIG. 7 and the methodologies of FIGS. 8, 10, and 11 or any portions thereof, are implemented in the computing platform 1200. In some embodiments, the computing platform 1200 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that has sufficient processor power and memory capacity to perform the operations described in this disclosure. In some embodiments, a distributed computational system is provided comprising a plurality of such computing devices.

The computing platform 1200 includes one or more storage devices 1290 and/or non-transitory computer-readable media 1230 having encoded thereon one or more computer-executable instructions or software for implementing techniques as variously described in this disclosure. In some embodiments, the storage devices 1290 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 1290 includes other types of memory as well, or combinations thereof. In one embodiment, the storage device 1290 is provided on the computing platform 1200. In another embodiment, the storage device 1290 is provided separately or remotely from the computing platform 1200. The non-transitory computer-readable media 1230 include, but are not limited to, one or more types of hardware memory, non-transitory tangible media (for example, one or more magnetic storage disks, one or more optical disks, one or more USB flash drives), and the like. In some embodiments, the non-transitory computer-readable media 1230 included in the computing platform 1200 store computer-readable and computer-executable instructions or software for implementing various embodiments. In one embodiment, the computer-readable media 1230 are provided on the computing platform 1200. In another embodiment, the computer-readable media 1230 are provided separately or remotely from the computing platform 1200.

The computing platform 1200 also includes at least one processor 1210 for executing computer-readable and computer-executable instructions or software stored in the storage device 1290 and/or non-transitory computer-readable media 1230 and other programs for controlling system hardware. In some embodiments, virtualization is employed in the computing platform 1200 so that infrastructure and resources in the computing platform 1200 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 1205 is also provided to allow for communication between the various components listed above and/or other components not shown. Computing platform 1200 can be coupled to a network 1250 (e.g., a local or wide area network such as the internet), through network interface circuit 1240 to allow for communications with other computing devices, platforms, resources, clients, and Internet of Things (IoT) devices.

In some embodiments, a user interacts with the computing platform 1200 through an input/output system 1260 that interfaces with devices such as a keyboard and mouse 1270 and/or a display element (screen/monitor) 1280. The keyboard and mouse may be configured to provide a user interface to accept user input and guidance, for example to control the graphlet identification process and/or other applications that employ the results of the graphlet identification process. The display element may be configured, for example, to display the results of processing using the disclosed techniques. In some embodiments, the computing platform 1200 includes other I/O devices (not shown) for receiving input from a user, for example, a pointing device or a touchpad, etc., or any suitable user interface. In some embodiments, the computing platform 1200 includes other suitable conventional I/O peripherals. The computing platform 1200 can include and/or be operatively coupled to various suitable devices for performing one or more of the aspects as variously described in this disclosure.

In some embodiments, the computing platform 1200 runs an operating system (OS) 1220, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 1200 and performing the operations described in this disclosure. In one embodiment, the operating system runs on one or more cloud machine instances.

As will be appreciated in light of this disclosure, the various modules and components of the system, as shown in FIGS. 1 and 7-10, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 1200, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 is a system for identifying typed graphlets in a heterogeneous network, the system comprising: a distribution processor configured to assign pairs of nodes of the heterogeneous network to one of a plurality of processors, each of the processors configured to perform computations to identify typed graphlets of the heterogeneous network, the typed graphlets associated with the pair of nodes assigned to the processor; a 3-node computation module, of the processor, configured to identify 3-node typed graphlets occurring between the pair of nodes assigned to the processor, the nodes connected by one or more edges; a k-node computation module, of the processor, configured to identify k-node typed graphlets occurring between the pair of nodes assigned to the processor, the identifying of the k-node typed graphlets based on combinatorial relationships between (k−1)-node typed graphlets occurring between the pair of nodes assigned to the processor, wherein k is an integer greater than 3; and a statistic computation processor configured to maintain a count of the identified 3-node type graphlets and k-node typed graphlets.

Example 2 includes the subject matter of Example 1, wherein the pair of nodes are designated node i and node j, and the 3-node computation module is further to identify the 3-node typed graphlets by computing, for each edge of the heterogeneous network connecting nodes i and j: a set of nodes that form typed triangles of type t with nodes i and j, the set denoted as T(i,j,t), based on an intersection of a set of neighbors of node i and a set of neighbors of node j; a set of nodes that form typed 3-node stars of type t centered at node i, the set denoted as S(i,t), based on a set of neighbors of node i that are not in the set T(i,j,t); a set of nodes that form typed 3-node stars of type t centered at node j, the set denoted as S(j,t), based on a set of neighbors of node j that are not in the set T(i,j,t); and a set of nodes that form typed 3-paths of type t with nodes i and j, the set denoted as S(i,j,t), based on a union of S(i,t) and S(j,t).

Example 3 includes the subject matter of Examples 1 or 2, further comprising a memory, wherein the identified k-node typed graphlets and 3-node typed graphlets, for which the associated count is non-zero, are stored in the memory.

Example 4 includes the subject matter of any of Examples 1-3, wherein the statistic computation module is further configured to compute a frequency of each of the k-node typed graphlets and 3-node typed graphlets, and perform predictive and/or descriptive modeling based on the frequency.

Example 5 includes the subject matter of any of Examples 1-4, wherein the system provides the identified k-node typed graphlets and 3-node typed graphlets to applications configured to perform at least one of visitor stitching, user profiling, outlier detection, and link prediction.

Example 6 includes the subject matter of any of Examples 1-5, wherein the nodes are associated with one or more of a web page type, a network address type, a location type, an internet session cookie type, a user identity type, a user characteristic type, and the edges are associated with one or more of a directional factor and a weighting factor.

Example 7 is a method for transforming a heterogeneous network into a plurality of typed graphlets, the method comprising: identifying, by a processor-based system, k-node typed graphlets occurring between any two selected nodes of a heterogeneous network, the nodes connected by one or more edges, the identifying based on combinatorial relationships between (k−1)-node typed graphlets occurring between the two selected nodes of the heterogeneous network, wherein k is an integer greater than 3; identifying, by the processor-based system, 3-node typed graphlets occurring between the two selected nodes of the heterogeneous network, wherein the identifying of the k-node typed graphlets and the 3-node typed graphlets is performed as a parallel computation for each of the two selected nodes of the heterogeneous network; and maintaining, by the processor-based system, a count of the identified 3-node type graphlets and k-node typed graphlets.

Example 8 includes the subject matter of Example 7, wherein the identifying of the 3-node typed graphlets occurring between the two selected nodes of the heterogeneous network (node i and node j) includes computing, for each edge of the heterogeneous network connecting nodes i and j: a set of nodes that form typed triangles of type t with nodes i and j, the set denoted as T(i,j,t), based on an intersection of a set of neighbors of node i and a set of neighbors of node j; a set of nodes that form typed 3-node stars of type t centered at node i, the set denoted as S(i,t), based on a set of neighbors of node i that are not in the set T(i,j,t); a set of nodes that form typed 3-node stars of type t centered at node j, the set denoted as S(j,t), based on a set of neighbors of node j that are not in the set T(i,j,t); and a set of nodes that form typed 3-paths of type t with nodes i and j, the set denoted as S(i,j,t), based on a union of S(i,t) and S(j,t).

Example 9 includes the subject matter of Example 7 or 8, further comprising storing the identified k-node typed graphlets and 3-node typed graphlets for which the associated count is non-zero.

Example 10 includes the subject matter of any of Examples 7-9, further comprising employing the identified k-node typed graphlets and 3-node typed graphlets to perform at least one of visitor stitching, user profiling, outlier detection, and link prediction.

Example 11 includes the subject matter of any of Examples 7-10, further comprising computing a frequency of each of the k-node typed graphlets and 3-node typed graphlets, and performing predictive and/or descriptive modeling based on the frequency.

Example 12 includes the subject matter of any of Examples 7-11, wherein the edges of the heterogeneous network are associated with a timestamp, and the count of the identified k-node typed graphlets and 3-node typed graphlets is maintained over a selected period of time, based on the timestamps.

Example 13 includes the subject matter of any of Examples 7-12, wherein the nodes are associated with one or more of a web page type, a network address type, a location type, an internet session cookie type, a user identity type, a user characteristic type, and the edges are associated with one or more of a directional factor and a weighting factor.

Example 14 includes the subject matter of any of Examples 7-13, wherein the heterogeneous network is one of a bipartite graph, a labeled graph, a signed graph, a k-partite graph, and a homogenous graph.

Example 15 is a computer program product including one or more non-transitory machine-readable mediums encoded with instructions that when executed by one or more processors cause a process to be carried out for identifying typed graphlets in a heterogeneous network, the process comprising: identifying k-node typed graphlets occurring between any two selected nodes of a heterogeneous network, the nodes connected by one or more edges, the identifying based on combinatorial relationships between (k−1)-node typed graphlets occurring between the two selected nodes of the heterogeneous network, wherein k is an integer greater than 3; and maintaining a count of the identified k-node typed graphlets, wherein the heterogeneous network is one of a social network, an internet network, a neural network and an infrastructure network.

Example 16 includes the subject matter of Example 15, further comprising identifying 3-node typed graphlets occurring between the two selected nodes of the heterogeneous network (node i and node j) by computing, for each edge of the heterogeneous network connecting nodes i and j: a set of nodes that form typed triangles of type t with nodes i and j, the set denoted as $T(i,j,t)$, based on an intersection of a set of neighbors of node i and a set of neighbors of node j; a set of nodes that form typed 3-node stars of type t centered at node i, the set denoted as $S(i,t)$, based on a set of neighbors of node i that are not in the set $T(i,j,t)$; a set of nodes that form typed 3-node stars of type t centered at node j, the set denoted as $S(j,t)$, based on a set of neighbors of node j that are not in the set $T(i,j,t)$; a set of nodes that form typed 3-paths of type t with nodes i and j, the set denoted as $S(i,j,t)$, based on a union of $S(i,t)$ and $S(j,t)$; maintaining a count of the identified 3-node typed graphlets; and storing the identified k-node typed graphlets and 3-node typed graphlets for which the associated count is non-zero.

Example 17 includes the subject matter of Examples 15 or 16, further comprising employing the identified k-node typed graphlets and 3-node typed graphlets to perform at least one of visitor stitching, user profiling, outlier detection, and link prediction.

Example 18 includes the subject matter of any of Examples 15-17, further comprising computing a frequency of each of the k-node typed graphlets and 3-node typed graphlets, and performing predictive and/or descriptive modeling based on the frequency.

Example 19 includes the subject matter of any of Examples 15-18, wherein the identifying of the k-node typed graphlets and the 3-node typed graphlets is performed as a parallel computation for each of the two selected nodes of the heterogeneous network.

Example 20 includes the subject matter of any of Examples 15-19, wherein the nodes are associated with one or more of a web page type, a network address type, a location type, an internet session cookie type, a user identity type, a user characteristic type, and the edges are associated with one or more of a directional factor and a weighting factor.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A system for identifying typed graphlets in a heterogeneous network, the system comprising:
    a distribution processor configured to assign pairs of nodes of the heterogeneous network to one of a plurality of processors, each of the processors configured to perform computations to identify typed graphlets of the heterogeneous network, the typed graphlets associated with the pair of nodes assigned to the processor;
    a 3-node computation module, of the processor, configured to identify 3-node typed graphlets occurring between the pair of nodes assigned to the processor, the nodes connected by one or more edges;
    a k-node computation module, of the processor, configured to identify k-node typed graphlets occurring between the pair of nodes assigned to the processor, the identifying of the k-node typed graphlets based on combinatorial relationships between (k−1)-node typed graphlets occurring between the pair of nodes assigned to the processor, wherein k is an integer greater than 3; and
    a statistic computation processor configured to maintain a count of the identified 3-node type graphlets and k-node typed graphlets.

2. The system of claim 1, wherein the pair of nodes are designated node i and node j, and the 3-node computation module is further to identify the 3-node typed graphlets by computing, for each edge of the heterogeneous network connecting nodes i and j:
    a set of nodes that form typed triangles of type t with nodes i and j, the set denoted as $T(i,j,t)$, based on an intersection of a set of neighbors of node i and a set of neighbors of node j;
    a set of nodes that form typed 3-node stars of type t centered at node i, the set denoted as $S(i,t)$, based on a set of neighbors of node i that are not in the set $T(i,j,t)$;

a set of nodes that form typed 3-node stars of type t centered at node j, the set denoted as S(j,t), based on a set of neighbors of node j that are not in the set T(i,j,t); and a set of nodes that form typed 3-paths of type t with nodes i and j, the set denoted as S(i,j,t), based on a union of S(i,t) and S(j,t).

3. The system of claim 1, further comprising a memory, wherein the identified k-node typed graphlets and 3-node typed graphlets, for which the associated count is non-zero, are stored in the memory.

4. The system of claim 1, wherein the statistic computation module is further configured to compute a frequency of each of the k-node typed graphlets and 3-node typed graphlets, and perform predictive and/or descriptive modeling based on the frequency.

5. The system of claim 1, wherein the system provides the identified k-node typed graphlets and 3-node typed graphlets to applications configured to perform at least one of visitor stitching, user profiling, outlier detection, and link prediction.

6. The system of claim 1, wherein the nodes are associated with one or more of a web page type, a network address type, a location type, an internet session cookie type, a user identity type, a user characteristic type, and the edges are associated with one or more of a directional factor and a weighting factor.

7. A method for transforming a heterogeneous network into a plurality of typed graphlets, the method comprising:
identifying, by a processor-based system, k-node typed graphlets occurring between any two selected nodes of a heterogeneous network, the nodes connected by one or more edges, the identifying based on combinatorial relationships between (k−1)-node typed graphlets occurring between the two selected nodes of the heterogeneous network, wherein k is an integer greater than 3;

identifying, by the processor-based system, 3-node typed graphlets occurring between the two selected nodes of the heterogeneous network, wherein the identifying of the k-node typed graphlets and the 3-node typed graphlets is performed as a parallel computation for each of the two selected nodes of the heterogeneous network; and maintaining, by the processor-based system, a count of the identified 3-node type graphlets and k-node typed graphlets.

8. The method of claim 7, wherein the identifying of the 3-node typed graphlets occurring between the two selected nodes of the heterogeneous network (node i and node j) includes computing, for each edge of the heterogeneous network connecting nodes i and j:

a set of nodes that form typed triangles of type t with nodes i and j, the set denoted as T(i,j,t), based on an intersection of a set of neighbors of node i and a set of neighbors of node j;

a set of nodes that form typed 3-node stars of type t centered at node i, the set denoted as S(i,t), based on a set of neighbors of node i that are not in the set T(i,j,t);

a set of nodes that form typed 3-node stars of type t centered at node j, the set denoted as S(j,t), based on a set of neighbors of node j that are not in the set T(i,j,t); and a set of nodes that form typed 3-paths of type t with nodes i and j, the set denoted as S(i,j,t), based on a union of S(i,t) and S(j,t).

9. The method of claim 7, further comprising storing the identified k-node typed graphlets and 3-node typed graphlets for which the associated count is non-zero.

10. The method of claim 7, further comprising employing the identified k-node typed graphlets and 3-node typed graphlets to perform at least one of visitor stitching, user profiling, outlier detection, and link prediction.

11. The method of claim 7, further comprising computing a frequency of each of the k-node typed graphlets and 3-node typed graphlets, and performing predictive and/or descriptive modeling based on the frequency.

12. The method of claim 7, wherein the edges of the heterogeneous network are associated with a timestamp, and the count of the identified k-node typed graphlets and 3-node typed graphlets is maintained over a selected period of time, based on the timestamps.

13. The method of claim 7, wherein the nodes are associated with one or more of a web page type, a network address type, a location type, an internet session cookie type, a user identity type, a user characteristic type, and the edges are associated with one or more of a directional factor and a weighting factor.

14. The method of claim 7, wherein the heterogeneous network is one of a bipartite graph, a labeled graph, a signed graph, a k-partite graph, and a homogenous graph.

15. A computer program product including one or more non-transitory machine-readable mediums encoded with instructions that when executed by one or more processors cause a process to be carried out for identifying typed graphlets in a heterogeneous network, the process comprising:

identifying k-node typed graphlets occurring between any two selected nodes of a heterogeneous network, the nodes connected by one or more edges, the identifying based on combinatorial relationships between (k−1)-node typed graphlets occurring between the two selected nodes of the heterogeneous network, wherein k is an integer greater than 3; and maintaining a count of the identified k-node typed graphlets, wherein the heterogeneous network is one of a social network, an internet network, a neural network and an infrastructure network.

16. The computer program product of claim 15, further comprising identifying 3-node typed graphlets occurring between the two selected nodes of the heterogeneous network (node i and node j) by computing, for each edge of the heterogeneous network connecting nodes i and j:

a set of nodes that form typed triangles of type t with nodes i and j, the set denoted as T(i,j,t), based on an intersection of a set of neighbors of node i and a set of neighbors of node j;

a set of nodes that form typed 3-node stars of type t centered at node i, the set denoted as S(i,t), based on a set of neighbors of node i that are not in the set T(i,j,t);

a set of nodes that form typed 3-node stars of type t centered at node j, the set denoted as S(j,t), based on a set of neighbors of node j that are not in the set T(i,j,t);

a set of nodes that form typed 3-paths of type t with nodes i and j, the set denoted as S(i,j,t), based on a union of S(i,t) and S(j,t);

maintaining a count of the identified 3-node typed graphlets; and storing the identified k-node typed graphlets and 3-node typed graphlets for which the associated count is non-zero.

17. The computer program product of claim 16, further comprising employing the identified k-node typed graphlets and 3-node typed graphlets to perform at least one of visitor stitching, user profiling, outlier detection, and link prediction.

18. The computer program product of claim 16, further comprising computing a frequency of each of the k-node typed graphlets and 3-node typed graphlets, and performing predictive and/or descriptive modeling based on the frequency.

19. The computer program product of claim 16, wherein the identifying of the k-node typed graphlets and the 3-node typed graphlets is performed as a parallel computation for each of the two selected nodes of the heterogeneous network.

20. The computer program product of claim 15, wherein the nodes are associated with one or more of a web page type, a network address type, a location type, an internet session cookie type, a user identity type, a user characteristic type, and the edges are associated with one or more of a directional factor and a weighting factor.

\* \* \* \* \*